United States Patent [19]
Dahll, V

[11] Patent Number: 5,195,757
[45] Date of Patent: Mar. 23, 1993

[54] PATTERNED TEXTURED SEAL

[75] Inventor: Hans H. Dahll, V, Danbury, N.H.

[73] Assignee: Freudenberg-NOK General Partnership, Plymouth, Mich.

[21] Appl. No.: 713,414

[22] Filed: Jun. 10, 1991

[51] Int. Cl.⁵ .............................................. T16J 15/32
[52] U.S. Cl. .................................... 277/134; 277/153
[58] Field of Search ............... 277/134, 152, 153, 133, 277/208

[56] References Cited

U.S. PATENT DOCUMENTS

| | | | |
|---|---|---|---|
| 3,501,155 | 3/1970 | Dega et al. | 277/134 X |
| 3,640,542 | 2/1972 | Mowat et al. | 277/134 |
| 3,929,340 | 12/1975 | Peisker | 277/134 |
| 3,973,781 | 8/1976 | Grorich | 277/134 |
| 4,118,856 | 10/1978 | Bainard et al. | 277/134 X |
| 4,155,560 | 5/1979 | Repella | 277/134 X |
| 4,560,177 | 12/1985 | Riley, Jr. | 277/134 |
| 4,568,092 | 2/1986 | Hayashida et al. | 277/134 X |

FOREIGN PATENT DOCUMENTS

| | | |
|---|---|---|
| 357875 | 5/1989 | European Pat. Off. . |
| 362468 | 5/1989 | European Pat. Off. . |
| 729128 | 12/1942 | Fed. Rep. of Germany ...... 277/134 |
| 1916214 | 10/1969 | Fed. Rep. of Germany ...... 277/134 |
| 3612420 | 10/1987 | Fed. Rep. of Germany . |
| 3744442 | 7/1989 | Fed. Rep. of Germany . |
| 876866 | 11/1942 | France . |
| 1339675 | 9/1963 | France ................. 277/134 |
| 1391410 | 1/1965 | France . |
| 163868 | 9/1983 | Japan ................. 277/134 |

Primary Examiner—William A. Cuchlinski, Jr.
Assistant Examiner—Scott W. Cummings
Attorney, Agent, or Firm—Dinnin & Dunn

[57] ABSTRACT

The present invention is a seal adapted to be disposed about a cylindrical shaft. The seal includes a body portion having an aperture a lip surface defining an aperture extending axially therethrough. The seal includes a textured pattern formed on the lip surface. The seal further includes at least one rib, ridge or recess extending along the lip surface for retaining a lubricant between the lip surface and the cylindrical shaft.

19 Claims, 1 Drawing Sheet

PATTERNED TEXTURED SEAL

BACKGROUND OF THE INVENTION

1. Field of the Invention

The present invention relates generally to seals, and more particularly to, a seal adapted to be disposed about a cylindrical shaft.

2. Description of the Related Art

Currently, seals are disposed about shafts such as a pinion shaft of an automotive vehicle. These seals typically have a lip surface which contacts the shaft. However, one problem with these seals is that if contact stress at the lip surface is generally high, a lubricant film formed on the lip surface tends to be squeezed out of the lip surface.

One attempted solution to this problem is to provide seals having a textured lip surface. An example of a seal having a textured lip surface is found in German Patent No. 3612-420-A. The textured lip surface reduces turning torque of the seals by retaining a lubricant film in a random pattern of texture.

One problem of conventional seals having textured lip surfaces is that the lubricant film may escape when the seal is subjected to pressure that squeezes the lip surface onto the shaft surface, thus flattening out some of the texture. Conventional seals having textured lip surfaces may also allow the lubricant film to escape when the lubricant viscosity is reduced (e.g., under high temperature conditions).

Another problem of conventional seals involves seals assembled in equipment and then stored for a period of time. Over time, contact stress at the lip surface squeezes any lubricant film out, and when the shaft is first moved, a high turning torque on the seal is experienced.

SUMMARY OF THE INVENTION

It is, therefore, one object of the present invention to provide a seal with a textured lip surface and a structure to retain a lubricant along the lip surface while the seal is operating.

It is another object of the present invention to provide a seal having a textured lip surface with a pattern of ribs, ridges, or recesses to retain a lubricant along the lip surface.

It is yet another object of the present invention to provide a seal with a lip surface which reduces torque on the seal during start up.

It is a further object of the present invention to provide a seal with a lip surface that retains a lubricant film when subjected to high contact stress at the lip surface.

It is a still further object of the present invention to provide a seal with a lip surface that retains a lubricant film when the lubricant viscosity is reduced.

To achieve the foregoing objects, the present invention is a seal adapted to be disposed about a cylindrical shaft. The seal includes a body portion having means forming an aperture extending axially therethrough. The body portion includes a lip surface defining the aperture. The seal includes means forming a textured pattern on the lip surface and means extending along the lip surface for retaining a lubricant between the lip surface and the cylindrical shaft.

One advantage of the present invention is that the seal utilizes a textured lip surface in conjunction with a pattern of ribs, ridges, or recesses to retain a lubricant along the lip surface while the seal is operating. Another advantage of the present invention is that the lip surface of the seal is provided with texturing and protrusions or recesses to retain a lubricant film along the lip surface to reduce torque on the seal encountered on start-up. Yet another advantage of the present invention is that the ribs, ridges, or recesses serve as dams or reseviors that will trap lubricant and hold it in place along the lip surface when subjected to high contact stress or reduced lubricant viscosity.

Other objects, features and advantages of the present invention will be readily appreciated as the same becomes better understood after reading the following description when taken in conjunction with the accompanying drawings.

DESCRIPTION OF THE PREFERRED EMBODIMENT(S)

Figure 1:
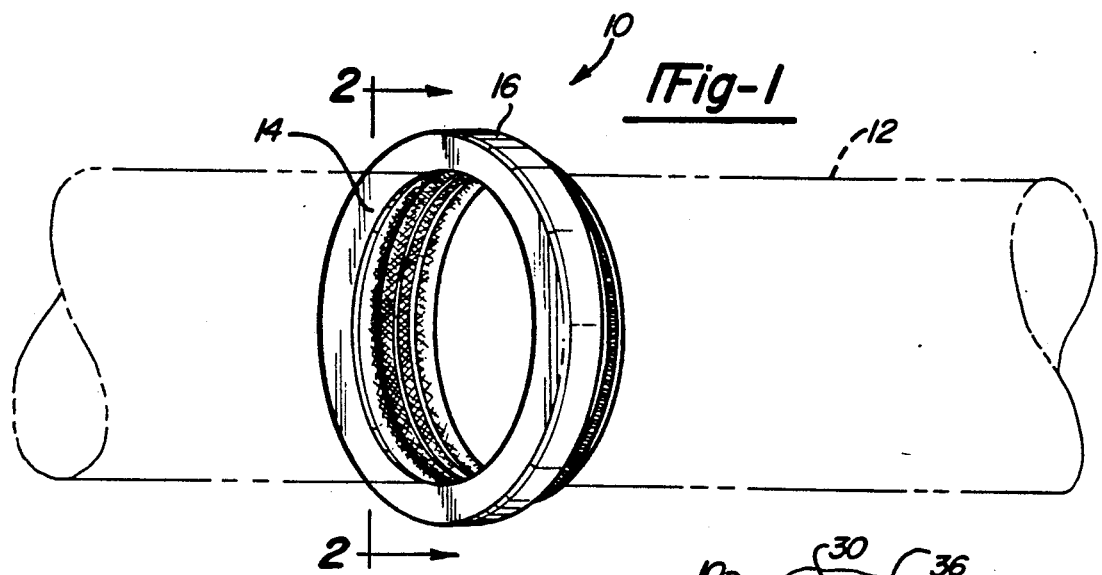
FIG. 1 is a perspective view of a seal according to the present invention.

Referring to FIG. 1, a seal 10 according to the present invention is shown. The seal 10 is adapted to be disposed about a cylindrical shaft 12 such as a pinion shaft or rod (illustrated in phantom lines) of an automotive vehicle. The seal 10 includes a body portion 14 having a generally cylindrical shape. The body portion 14 has a flange portion 16 extending radially outwardly at one axial end. An insert 18 may be disposed within the body portion 14 and extended into the flange portion 16. The insert 18 is generally annular in shape with an L-shaped cross-section. The insert 18 adds a desired stiffness to the flange portion 16. The insert 18 is preferably made of a metal material such as steel. It should be appreciated that the insert 18 may be made of any suitable material to provide a desired stiffness to the flange portion 16.

The body portion 14 also includes a recess 20 in an outer periphery thereof near the other axial end. The recess 20 is generally arcuate in cross-section and extends radially inward and circumferentially about the outer periphery of the body portion 14. A spring 22 may be disposed in the recess 20. The spring 22 has a generally circular cross-section and is annular in shape. The spring 22 is made of a metal material and is formed as a coil spring. It should be appreciated that the spring 22 may be made of any suitable material which acts to urge the axial end of the body portion 14 radially inward.

The body portion 14 further includes an aperture 24 extending axially therethrough. The aperture 24 is defined by a sealing or lip surface 26. The lip surface 26 extends radially and axially inward from a first end 28 at the flange portion 16 toward a second end 30 near the other axial end of the body portion 14. The remaining portion of the aperture 24 is defined by an end relief surface 32 extending radially and axially outwardly from second end 30 to the opening of the aperture 24. It should be appreciated that the cylindrical shaft 12 extends through the aperture 24.

Figure 2:
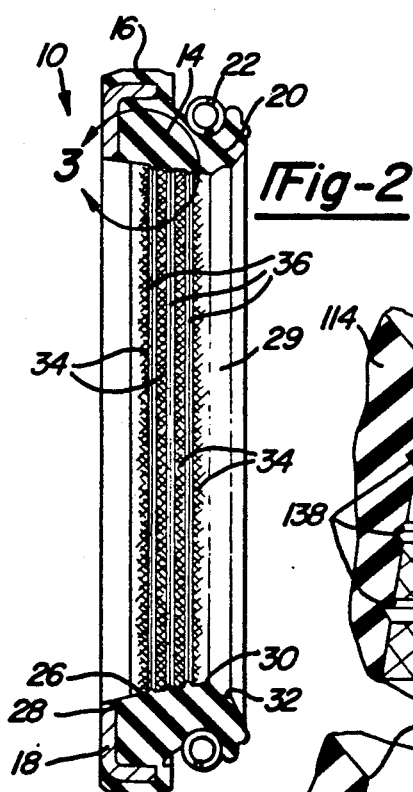
FIG. 2 is a sectional view taken along line 2—2 of FIG. 1.
Figure 3:
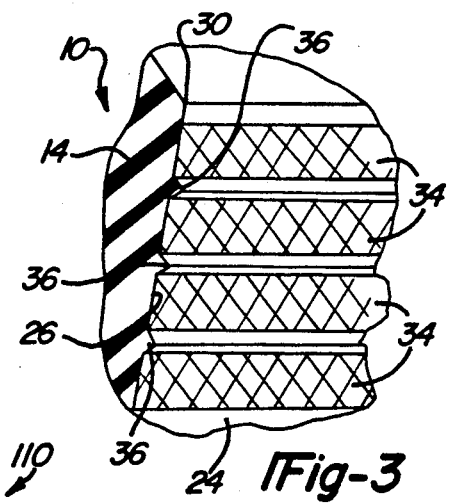
FIG. 3 is an enlarged partial view of a portion of the structure illustrated in circle 3 of FIG. 2.

Referring to FIGS. 2 and 3, the seal 10 also includes a textured pattern formed along the lip surface 26. The textured pattern is formed as a plurality of bands 34. In the preferred embodiment, there are four (4) bands 34 formed circumferentially about the lip surface 26 and spaced axially therealong between the first end 28 and second end 30. The bands 34 act to retain lubricant between the lip surface 26 and surface of cylindrical shaft 12.

The seal 10 further includes at least one, preferably a plurality of ribs, ridges or protrusions 36 along the lip surface 26. The protrusions 36 extend radially outwardly from the lip surface 26 into the aperture 24 and are circumferentially continuous about the lip surface 26. The protrusions 36 are preferably V-shaped and spaced apart axially along the lip surface 26. In the preferred embodiment, three (3) protrusions 36 are provided such that one protrusion 36 is disposed between a pair of adjacent bands 34. The protrusions 36 retain or trap a lubricant or lubricant film along the bands 34 between the lip surface 26 and the surface of the shaft 12.

Preferably, the seal 10 is made of an elastomeric material such as HNBR having a durometer approximately between 75-85 Shore A. The bands 34 may have a random texture formed by conventional electro-discharge machining (EDM), or a herring bone knurl formed by a knurling process or a square knurl formed by a knurling process. Preferably, the bands 34 have a random texture.

Figure 4:
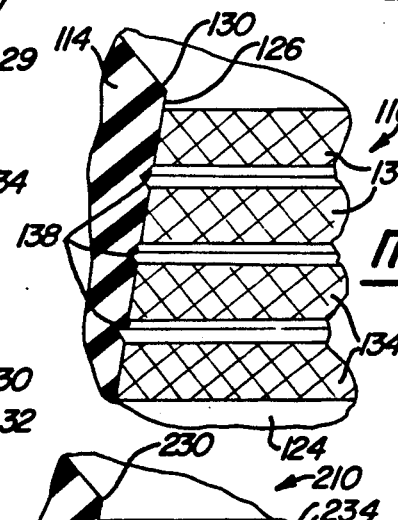
FIG. 4 is a view similar to FIG. 3 of a first alternate embodiment of the seal of FIGS. 1 and 2.

Referring to FIG. 4, a first alternate embodiment 110 of the seal 10 is shown. Like parts have like numerals increased by one hundred (100). The seal 110 includes at least one, preferably a plurality of recesses 138 along the lip surface 126. The recesses 138 extend radially inward into the body portion 114 and are circumferentially continuous about the lip surface 126. The recesses 138 are preferably V-shaped in cross-section and spaced apart axially along the lip surface 126. In the preferred embodiment, three (3) recesses 138 are provided such that one recess 138 is disposed between a pair of adjacent bands 134. The recesses 138 retain or trap lubricant along the bands 134 between the lip surface 126 and the surface of the shaft 12.

Figure 5:
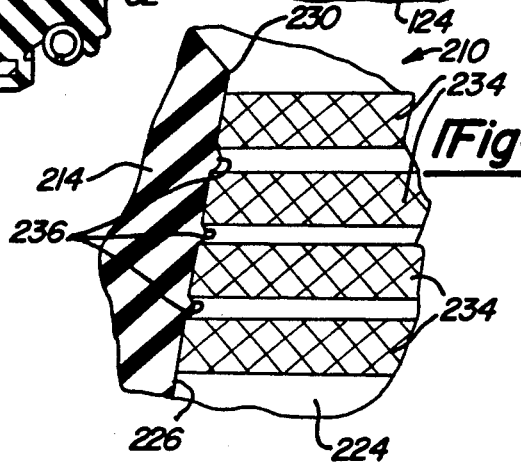
FIG. 5 is a view similar to FIG. 3 of a second alternate embodiment of the seal of FIGS. 1 and 2.

Referring to FIG. 5, a second alternate embodiment 210 of the seal 10 is shown. Like parts have like numerals increased by two hundred (200). The seal 210 includes at least one, preferably a plurality of protrusions 236 along the lip surface 226. The protrusions 236 extend radially outwardly from the lip surface 226 into the aperture 224 and are circumferentially continuous about the lip surface 226. The protrusions 236 are preferably arcuately shaped in cross-section and spaced apart axially along the lip surface 226. In the preferred embodiment, three (3) protrusions 236 are provided such that one protrusion 236 is disposed between a pair of adjacent bands 234. The protrusions 236 retain or trap lubricant along the bands 234 between the lip surface 226 and the surface of the shaft 12.

Figure 6:
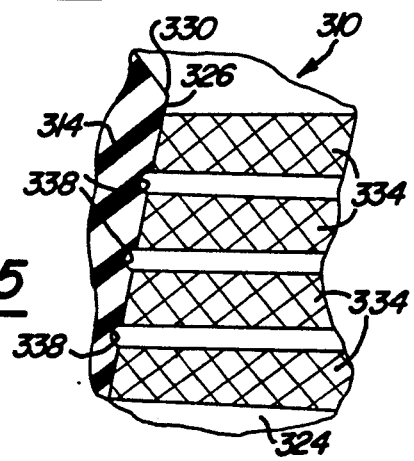
FIG. 6 is a view similar to FIG. 3 of a third alternate embodiment of the seal of FIGS. 1 and 2.

Referring to FIG. 6, a third alternate embodiment 310 of the seal 10 is shown. Like parts have like numerals increased by three hundred (300). The seal 310 includes at least one, preferably a plurality of recesses 338 along the lip surface 326. The recesses 338 extend radially inward into the body portion 314 and are circumferentially continuous about the lip surface 326. The recesses 338 are preferably arcuately shaped in cross-section and spaced apart axially along the lip surface 326. In the preferred embodiment, three (3) recesses 338 are provided such that one recess 338 is disposed between a pair of adjacent bands 334. The recesses 338 retain or trap lubricant along the bands 324 between the lip surface 326 and the surface of the shaft 12.

Accordingly, the seal 10 holds more of a lubricant film in place while the seal is operating. The ribs, ridges or recesses act as dams or reservoirs to trap the lubricant and hold it in place along the bands 34 between the lip surface 26 and the surface of the shaft 12. This results in a reduction of torque on the seal 10 during start-up. Further, the lubricant film is retained along the lip surface 26 when the seal 10 is subjected to contact stress or reduced viscosity of the lubricant.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A seal adapted to be disposed about a cylindrical shaft, comprising:
    a body portion including means forming an aperture extending axially therethrough;
    said body portion including an axially extending frustoconical lip surface defining said aperture;
    means forming a textured pattern on said lip surface; and
    means extending along said lip surface for retaining lubricant between said lip surface and the cylindrical shaft, wherein said textured pattern means comprises a plurality of bands having a textured pattern and axially spaced and extending circumferentially about said lip surface.

2. A seal as set forth in claim 1 wherein said body portion includes a flange portion extending radially outwardly at one end.

3. A seal as set forth in claim 2 wherein said body portion includes an annular recess in the outer periphery thereof.

4. A seal as set forth in claim 3 including a spring disposed in said annular recess.

5. A seal as set forth in claim 1 wherein said retaining means comprises at least one recess.

6. A seal as set forth in claim 5 wherein said recess has a generally V-shaped cross-section.

7. A seal as set forth in claim 5 wherein said recess has a generally arcuate cross-section.

8. A seal as set forth in claim 1 wherein said retaining means comprises at least one protrusion extending inwardly radially.

9. A seal as set forth in claim 8 wherein said protrusion has a generally V-shaped cross-section.

10. A seal as set forth in claim 8 wherein said protrusion has a generally arcuate cross-section.

11. A seal adapted to be disposed about a cylindrical shaft, comprising:
    a body portion including means forming an aperture extending axially therethrough;
    said body portion including an axially extending frustoconical lip surface defining said aperture;

a plurality of bands having a textured pattern and axially spaced and extending circumferentially about said lip surface; and means disposed between a pair of adjacent of said bands and extending circumferentially about said lip surface for retaining lubricant along said bands between said lip surface and the cylindrical shaft.

12. A seal as set forth in claim 11 wherein said retaining means comprises at least one recess.

13. A seal as set forth in claim 12 wherein said recess has a generally V-shaped cross-section.

14. A seal as set forth in claim 12 wherein said recess has a generally arcuate cross-section.

15. A seal as set forth in claim 11 wherein said retaining means comprises at least one protrusion extending inwardly radially.

16. A seal as set forth in claim 15 wherein said protrusion has a generally V-shaped cross-section.

17. A seal as set forth in claim 15 wherein said protrusion has a generally arcuate cross-section.

18. A seal adapted to be disposed about a cylindrical shaft, comprising:

a body portion including means forming an aperture extending axially therethrough;

said body portion including an axially extending frustoconical lip surface defining said aperture;

a plurality of bands having a textured pattern and axially spaced and extending circumferentially about said lip surface;

means forming at least one recess disposed between a pair of adjacent of said hands and extending circumferentially about said lip surface for retaining lubricant along said bands between said lip surface and the cylindrical shaft;

said body portion including a flange portion extending radially outwardly at one end and an annular recess in the outer periphery thereof; and a spring disposed in said annular recess.

19. A seal adapted to be disposed about a cylindrical shaft, comprising:

a body portion including means forming an aperture extending axially therethrough;

said body portion including an axially extending frustoconical lip surface defining said aperture;

a plurality of bands having a textured pattern and axially spaced and extending circumferentially about said lip surface;

means forming at least one protrusion disposed between a pair of adjacent of said bands and extending circumferentially about said lip surface for retaining lubricant along said bands between said lip surface and the cylindrical shaft;

said retaining means comprising at least one protrusion extending inwardly radially;

said body portion including a flange portion extending radially outwardly at one end and an annular recess in the outer periphery thereof; and a spring disposed in said annular recess.

* * * * *